Nov. 2, 1937.  F. E. WOLCOTT  2,097,825
COFFEE MAKER STOVE
Filed April 26, 1934  2 Sheets-Sheet 1
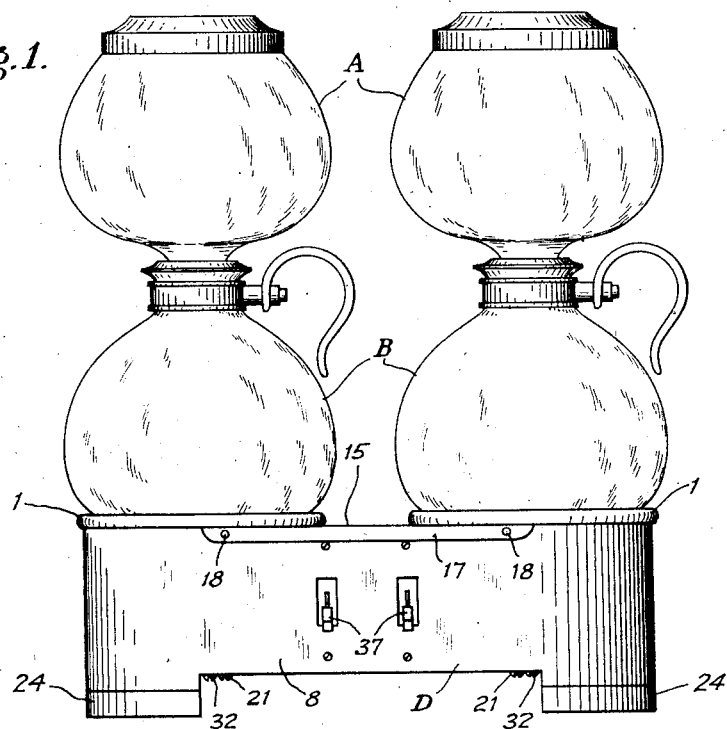
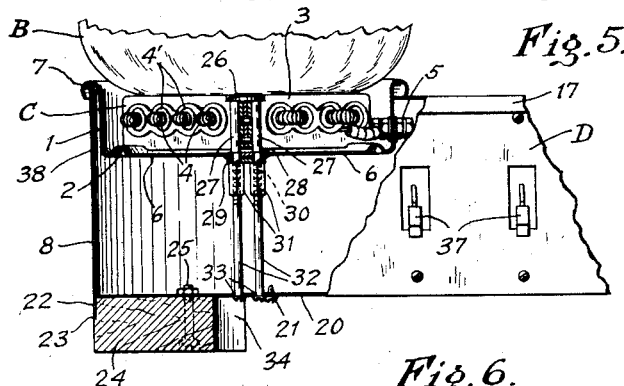
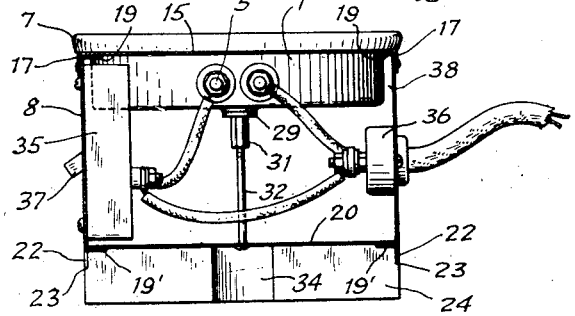
INVENTOR:
FRANK E. WOLCOTT
BY
ATTORNEY Nov. 2, 1937.　　　　F. E. WOLCOTT　　　　2,097,825
COFFEE MAKER STOVE
Filed April 26, 1934　　　2 Sheets-Sheet 2
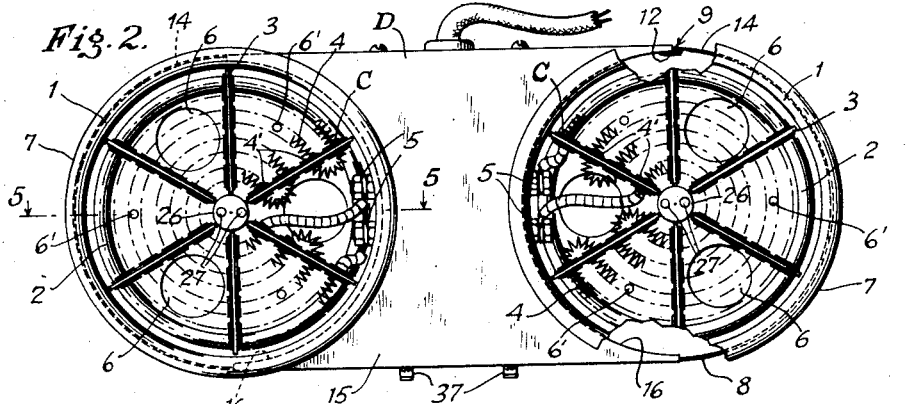
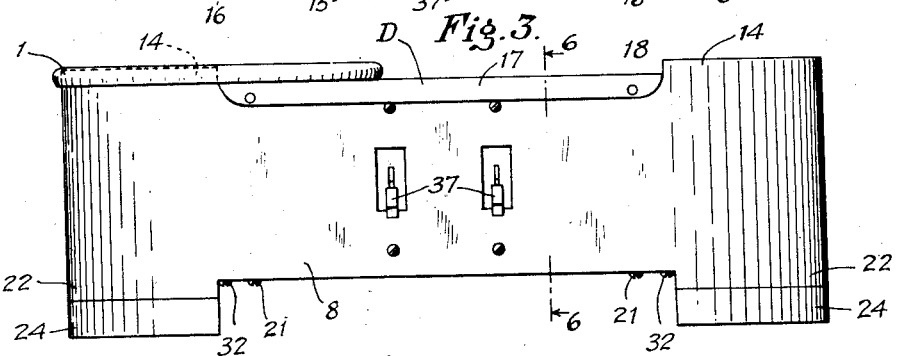
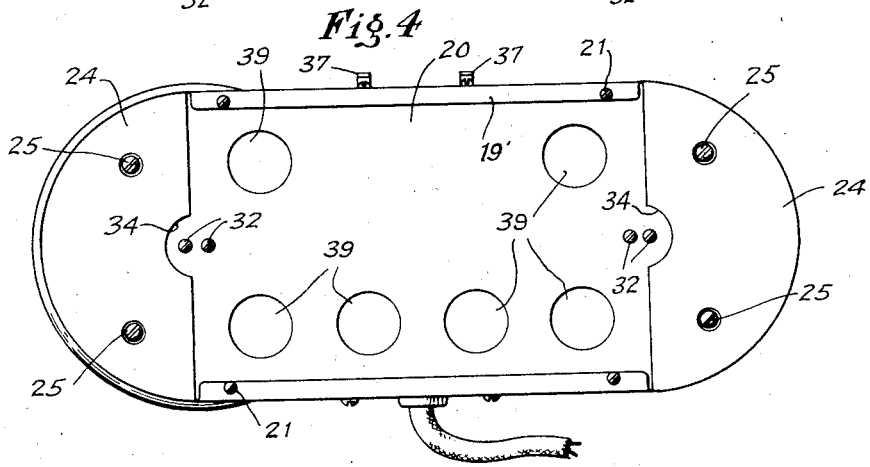
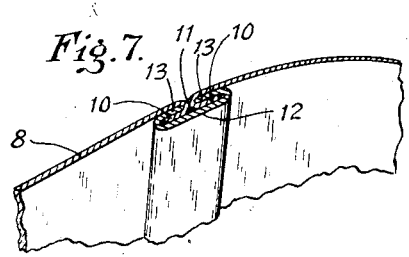
INVENTOR:
FRANK E. WOLCOTT
BY
ATTORNEY.

Patented Nov. 2, 1937

2,097,825

UNITED STATES PATENT OFFICE 2,097,825

COFFEE MAKER STOVE

Frank E. Wolcott, West Hartford, Conn., assignor, by mesne assignments, to The Silex Company, a corporation of Connecticut (1936)

Application April 26, 1934, Serial No. 722,500

22 Claims. (Cl. 219—43)

My invention relates to coffee maker stoves. It has for its object to provide an improved coffee maker stove and, more particularly, an improved coffee maker stove of the multiple unit type. A further object of my invention is to provide an improved quick cooling coffee maker stove and, more particularly, such a device of the multiple electric unit type. A still further object of my invention is to provide such a coffee maker stove having an improved and simplified casing, whereby, although a plurality of heating units are employed, it is made possible to eliminate corners or the like and form the casing body of a single strip of metal, while also producing an exceedingly attractive and compact construction. Other objects include the provision of improved heater unit supporting and connecting means and improved bridging and improved supporting means for the casing aforesaid, all in such manner as, while producing an effective stove, to enable the same to be very simply and inexpensively produced. These and other objects and advantages of my improved construction will, however, hereinafter more fully appear.

In the accompanying drawings, I have shown for purposes of illustration one embodiment which my invention may assume in practice.

In these drawings:

Figure 1 is a side elevation of a coffee maker embodying my improvements;

Figure 2 is a plan view of the two unit stove, portions of the same being broken away to facilitate illustration;

Figure 3 is a side elevation of this stove, the right hand heating unit being removed to facilitate illustration;

Figure 4 is a bottom plan view of the stove;

Figure 5 is a section on line 5—5 of Fig. 2;

Figure 6 is a section on line 6—6 of Fig. 1, and

Figure 7 is an enlarged detail sectional view of the joint between the ends of the side strip.

In Figure 1, I have shown an electric coffee maker stove of the quick cooling type used in connection with vacuum type coffee makers having operatively connected upper filter carrying coffee bowls A and lower bowls B, the lower bowls B being seated on a plurality of electric heating units, generally indicated at C, disposed at opposite ends of the upper surface of a casing, generally indicated at D, and mounted thereon and connected thereto in an improved manner, while the casing itself is also of an improved construction and supported in an improved manner as hereinafter described.

Referring more particularly to the heater units C, it will be noted that, while these may be of different types of construction, as hereinafter appears, both are herein of the same quick cooling construction adapted to cooperate with the vacuum type coffee maker, so that a description of one will suffice for both. As shown, each unit comprises a bowl 1 of light metal having a raised annular bead 2 in its bottom supporting the extremities of a spider type combined grid and resistance support 3, preferably of metal, having a resistance wire 4 extending through insulated eyelets 4' in the spider arms below the upper surface of the spider, while the ends of the resistance wire are connected to usual binding screws 5. It will also be noted that the bowl 1 is provided with a plurality of large apertures 6 and intermediate small apertures 6' in its bottom permitting the free passage of air through the latter and the heating unit, upon the lower bowl of the coffee maker which rests on the top of the grid formed by the spider 3. Moreover, it will be noted that each bowl 1 is provided with an enlarged top, herein in the form of an outwardly and then down turned curved flange 7 on its upper edge which is in turn supported on the casing while the unit and bowl are attached to the casing, all as hereinafter described.

Referring more particularly to the casing D, it will be noted that the same herein comprises a vertically disposed band or strip of sheet metal 8 forming the entire outer sides of the casing and provided with rounded ends conforming to the curvature of the ends of the bowls 1 containing the heater units and with straight sides spaced by a distance substantially equal to the diameter of the flanges 7. While this strip 8 may be made up and connected in various ways, it herein is in the form of a single sheet of sheet metal connected at its ends by a single joint at the back near one of the rounded ends and generally indicated at 9 in Figure 2, and shown in enlarged sectional detail in Figure 7. In the latter figure, it will be noted that this joint comprises inturned edges 10 on the ends of the strip 8 abutting at 11 and having a clip 12 receiving the ends 10 and in turn having spaced inturned edge portions 13 passing between the edges 10 and the body of the strip 8, all in such manner as to provide a simple yet very strong joint when the parts are suitably compressed.

Referring more particularly to the top of the casing D, it will be noted that the strip 8 is provided with upstanding cut edge portions 14 extending upward inside the overturned flanges 7 on the unit bowls 1 in such manner as to support the outwardly extending portion of the flange on the upper cut edges of this portion 14. Herein, the strip 8 is also provided with an upper bridge member 15 having semi-circular cut outs 16 in each side adapted to receive the bowls 1 when the bridging member 15 is disposed as shown in Figure 2 across the middle of the casing frame formed by the upright member 8. While this bridge member may be connected to the sides of the member 8 in various ways, it herein is provided with a depending flange 17 on each edge suitably attached as by rivets 18 to the top of the strip 8 between the upwardly projecting end portions 14 on the latter and overlying horizontally disposed flange portions 19 on the top of the strip and between the portion 14 thereon.

As regards the bottom of the casing D, it will be noted that corresponding horizontally disposed flange portions 19' are provided on the strip 8 beneath a bottom plate 20 conforming to the member 8 and received in the bottom thereof, these members 19 being suitably connected to the member 20 as by screws 21. Here, also it will be noted that depending portions 22, corresponding to the upstanding top portions 14 previously described, are provided on the bottom of the strip 8. These portions 22 are disposed herein in corresponding grooves 23 or cut back portions in forming shoulders on the upper outer edges of semi-circular foot members 24, herein in the form of plates of suitable insulating composition or wood, herein wood, in such manner as to overlie the latter members while forming a smooth or flush exterior joint. As shown the members 22 are also suitably attached to the bottom member 20 by counter sunk screws 25, in such manner as to raise the portions 19' and the bottom member 20 above the floor level while supporting the entire casing securely upon the two members 24 and effectually insulating the casing.

As regards connecting the units C in position in the casing thus provided, it will also be noted that improved clamping means are provided between the units and the bottom 20. Herein, each unit includes, in addition to the spider 3, a clamping member 26 therefor overlying the axis of the spider and having depending portions 27 passing down between arms of the spider and through a disc or washer 28 underlying the spider and also through the bottom of the bowl 1 and, if desired, a like outer disc member 29 similar to the member 28. As shown, each of these depending members 27 is also threaded at its lower end as at 30 and has a nut 31 substantially longer than the protruding threaded end of the member 27 and threaded on the threaded extremity thereof. Further, it will be noted that screws 32 are extended through a pair of adjacent apertures 33 in the bottom 20 and have their heads engaging the bottom and their upper ends threaded into the lower ends of these elongated nuts 31, while free access to the slotted ends of the screws is provided by suitably cutting away the adjacent portion of the foot member 24 as at 34.

Referring more particularly to the electrical connections for the units C, it will be noted that the binding screws 5 for these units are disposed on the adjacent sides of the units. Further, these screws 5 are connected to conductors leading to a switch 35 of any suitable type carried inside the front wall of the casing member 8 and to a line connection 36 carried inside the rear wall of that member. Although other types of switch may be used if desired, herein, the switch is of a type having a plurality of swinging levers 37, one for each unit and carried on a single base, while the two levers 37 are disposed side by side in the center of the front of the casing, and the line connection 36 is located centrally at the back of the casing. Thus, the connections being close together, only short conductors are required, while the switches permit the units to be used singly when desired, with the switch nearest to the unit controlling the latter.

As regards quick cooling, it will be noted that, in addition to the apertures 6, 6' in the bottom of the bowls 1, these bowls are relatively shallow and spaced from the rounded end walls of the casing member 8 by an air space 38, while being supported by the upstanding edge portions 14 on the latter member within the heat radiating rims 7, and having only the lower edges of the latter engaging the bridging member 15. Moreover, it will be noted that a plurality of large apertures 39 is provided, preferably as shown, in the bottom 20 in such manner as to permit a free flow of air in between the feet 24 and under the bottom 20 and up through the latter and through and around bowls 1 and the heating units therein, all in such manner as to produce a construction which cooperates with the quick cooling structure and the lower bowls, which cannot seal off the units at the top, to provide very effective quick cooling, eliminating any necessity for the removal of the coffee makers from the stoves in order to effect the return of the brewed coffee from the upper bowl to the lower bowl upon the completion of a normal infusion period following cutting off the current. Attention is also directed to the fact that the air circulation and insulation is such as, despite the use of heating units of high heat capacity, to make it possible to avoid overheating, or discoloration of the stove casing.

Among other results of my improved construction, it will be observed that it is made possible to obtain the advantages in a plural unit coffee maker of the single strip of metal used to form the sides of the whole stove, while also eliminating the expense incident to the use of corners on the stove, previously considered necessary in plural unit stoves. It will further be evident that through the elimination of these corners, a more compact stove structure is provided and one in which the curved ends made possible are very attractive in effect. Further, as a result of my improved construction, including the single side strip and the bridging strips, it is possible to minimize the waste of sheet metal in forming the stoves, the side strips being formed from sheet metal with little or no waste and the bridging strips making it possible to utilize small pieces, while the whole metal casing is very readily and cheaply assembled. By reason of the provision of the corresponding top and bottom portions 14 and 22, it is also made possible to assemble the bridge 15 between either the projections 14 or the projections 22 while the bowls 1 and foot members 24 may also be assembled on either the projections 14 or 22, depending upon where the bridge is assembled. As a result of the use of my improved foot members, it will also be observed that a very stable stove is provided having not only an attractive appearance but the desired support of the casing in such manner as to insulate the same effectually from the table or the like, while permitting the desired air flow to the units. The latter are also, it will be noted, securely held in position while being readily releasable for removal when desired, upon release of the screws 32 readily accessible from the bottom, the bowls then being, of course, readily raised to disconnect the conductors.

While I have herein shown both units as of the quick cooling type, it will, of course, be understood that, if desired, one of these may be of the non-quick cooling or so-called "warmer" type, adapted to keep the coffee bowl warm and cool slowly, as distinguished from bringing the coffee to a boil and after cessation of current flow quickly cool the coffee bowl as in the case of a quick cooling unit which is used in the coffee making operation. Further, it will be evident that other forms of quick cooling units than the spider type illustrated may be used if desired. Also, it will be evident that instead of utilizing only two units, three or more may be embodied in a single stove of my improved construction, this requiring only the necessary lengthening of the casing, and a lengthening of the bridging member to provide space for one or more intermediate circular bowl apertures therein. These and other advantages of my improved construction will, however, be clearly apparent to those skilled in the art.

While I have in this application specifically described one embodiment which my invention may assume in practice, it will be understood that this form is shown for purposes of illustration, and that the same may be modified and embodied in other forms without departing from the spirit or the scope of the appended claims.

What I claim as new and desire to secure by Letters Patent is:—

1. In a coffee maker stove, a plurality of means for supporting bowls during heating and having non-adjacent curved sides, and a casing carrying said means in spaced relation and having curved portions supporting said means and substantially conforming to the non-adjacent sides of said means.

2. In a coffee maker stove, a plurality of means for supporting bowls during heating, and a casing carrying said means in spaced relation and having curved ends supporting said means and substantially conforming to the remote sides of said means and also having parallel sides spaced by a distance substantially equal to the diameter of said supporting means.

3. In a stove, a plurality of electric heating units including unit housing bowls having curved sides and outwardly flanged tops, and a casing enclosing the bottoms of said bowls carrying said bowls in laterally spaced relation and having upstanding curved end wall portions conforming to and engaging and supporting the said tops of the remote curved sides of the bowls and a portion intermediate said bowls supporting the adjacent sides thereof.

4. In a stove, a plurality of coffee maker bowl supporting means having curved side portions, a casing carrying said means in laterally spaced relation and having curved portions conforming to and supporting the non-adjacent curved sides of said portions, and means on the top of said casing cooperating to support said means.

5. In a stove, a plurality of electric heating units including unit housing bowls having flanges thereon, a casing having curved ends extending into and supporting remote sides of said flanges, and means on the top of said casing cooperating to support said flanges.

6. In a stove, a plurality of electric heating units including unit housing bowls, and a casing carrying said bowls in spaced relation and including a band having curved ends conforming to and supporting the remote sides of said bowls, and a bridge member cooperating in supporting the adjacent sides of the latter and supported on said band.

7. In a stove, a plurality of electric heating units including unit housing bowls having flanges thereon, a casing including a vertical metal strip having curved ends extending into said flanges, and cooperating bridge means supported on the top of said strip between said bowls and cooperating in supporting said flanges.

8. In a stove, a plurality of electric heating units including unit housing bowls, a casing carrying said bowls in spaced relation including a single strip of metal forming the sides of the casing, and cooperating bridge means supported on said strip between its ends, said bowls having flanged upper ends overlying said bridge means and the ends of said strip and said strip having edges at opposite ends of said bridge projecting upwardly into said flanges.

9. In a stove, a plurality of electric heating units including unit housing bowls having flanges thereon, a casing carrying said bowls in spaced relation and having curved ends having portions disposed within said flanges, a bottom member in said casing spaced below said bowls, and axially located connecting means clamping said units and bowls to said bottom member and said flanges on said portions.

10. In a coffee maker stove, bowl supporting means, a casing supporting said means and having curved sides extending around the latter, and spaced foot forming members disposed beneath the opposite curved sides of said casing and substantially conforming to said curved sides.

11. In a coffee maker stove, a plurality of means for supporting bowls during heating, a casing supporting said means and having curved ends extending around the latter and substantially conforming thereto, and foot plates having curved outer ends substantially conforming to and underlying the curved ends of said casing and spaced apart at their inner ends.

12. In a coffee maker stove, a plurality of unit housing bowls, a casing member supporting said bowls having curved ends extending around said bowls and bridge means also supporting the latter, and foot members disposed beneath the opposite curved ends of said casing and substantially conforming to said curved ends.

13. In a coffee maker stove, a plurality of unit housing bowls, a casing member supporting said bowls having curved ends extending around said bowls and bridge means also supporting the latter, and foot members disposed beneath the opposite curved ends of said casing and substantially conforming to said curved ends, said foot members comprising plates underlying the bottoms of the ends of said casing and spaced apart at their inner ends.

14. In a coffee maker stove, a plurality of unit housing bowls, a casing member supporting said bowls having curved ends extending around said bowls and bridge means also supporting the latter, and foot members disposed beneath the opposite curved ends of said casing and substantially conforming to said curved ends, said foot members comprising spaced plates having an air space therebetween and said casing and bowls 15. In a coffee maker stove, a plurality of unit housing bowls, a casing member supporting said bowls having curved ends extending around said bowls and bridge means also supporting the latter, and foot members disposed beneath the opposite curved ends of said casing and substantially conforming to said curved ends, said casing having upwardly and downwardly projecting portions on its curved ends respectively supporting said bowls and supported on said foot members.

16. In a coffee maker, a plurality of laterally spaced bowl supporting means, a casing supporting the same and having curved ends supporting and extending around laterally spaced supporting means and substantially conforming to the remote sides thereof, and spaced foot forming members disposed beneath and supporting the opposite curved ends of said casing and substantially conforming to said curved ends.

17. In a coffee maker stove, a bowl, a support for said bowl, a resistance carrying spider in said bowl, and means bridging the axis of said spider and axially connected to said support positioning said spider and bowl on said support.

18. In a coffee maker stove, a bowl, a support for said bowl, a spider in said bowl and having radially disposed resistance carrying arms, means bridging the axis of said spider and axially connecting the latter to said bowl, and means connected to said connecting means for connecting said bowl to said support.

19. In a coffee maker stove, an apertured casing having a bottom, a bowl seated in the aperture therein above said bottom, a resistance carrying spider seated in said bowl, and means bridging the axis of said spider and axially connected to said bottom and positioning said spider and bowl in said casing.

20. In a coffee maker stove, an apertured casing having a bottom, a bowl seated in the aperture therein above said bottom, a resistance carrying spider seated in said bowl, and means bridging the axis of said spider and axially connected to said bottom and positioning said spider and bowl in said casing comprising a bridging member bridging said spider, nuts threaded on the lower ends of said member, and connecting members seated in said bottom and threaded into said nuts.

21. In a coffee maker stove, a plurality of laterally spaced bowl supporting means, a casing supporting the same and having curved ends supporting and extending around said means and substantially conforming to the remote sides of said means and bridging means also supporting said supporting means and extending between the latter, foot members disposed beneath the opposite ends of said casing and substantially conforming to said ends, and heating means beneath one or more of said supporting means and having communicating air passage means leading from between said foot members through said casing and supporting means.

22. A stove casing for coffee maker stoves comprising a band having curved ends and like upward and downward projections on said ends and corresponding bridge receiving portions between said projections, a bridge member carried on one of said portions, bowl supporting means carried on one of said sets of projections and conforming substantially to said curved ends and disposed at opposite ends of said bridge member, and foot members carried on the other of said sets of projections and disposed on the set of projections on the opposite side of said band from said bridging member and supporting means.

FRANK E. WOLCOTT.

---

CERTIFICATE OF CORRECTION.

Patent No. 2,097,825.    November 2, 1937.

FRANK E. WOLCOTT.

It is hereby certified that error appears in the printed specification of the above numbered patent requiring correction as follows: Page 4, second column, line 21, claim 21, strike out the words "beneath one or more of" and insert instead operating on bowls on; and that the said Letters Patent should be read with this correction therein that the same may conform to the record of the case in the Patent Office.

Signed and sealed this 18th day of January, A. D. 1938.

Henry Van Arsdale,
Acting Commissioner of Patents.

(Seal)